United States Patent
Aull

(10) Patent No.: US 7,069,440 B2
(45) Date of Patent: Jun. 27, 2006

(54) TECHNIQUE FOR OBTAINING A SINGLE SIGN-ON CERTIFICATE FROM A FOREIGN PKI SYSTEM USING AN EXISTING STRONG AUTHENTICATION PKI SYSTEM

(75) Inventor: Kenneth W. Aull, Fairfax, VA (US)

(73) Assignee: Northrop Grumman Corporation, Los Angeles, CA (US)

( * ) Notice: Subject to any disclaimer, the term of this patent is extended or adjusted under 35 U.S.C. 154(b) by 834 days.

(21) Appl. No.: 09/822,958

(22) Filed: Mar. 30, 2001

(65) Prior Publication Data

US 2002/0176582 A1 Nov. 28, 2002

Related U.S. Application Data

(60) Provisional application No. 60/229,336, filed on Sep. 1, 2000, provisional application No. 60/210,464, filed on Jun. 9, 2000, and provisional application No. 60/210,462, filed on Jun. 9, 2000.

(51) Int. Cl.
*H04L 9/00* (2006.01)

(52) U.S. Cl. .................. 713/175; 713/201; 713/156; 713/157

(58) Field of Classification Search ........... 713/182, 713/201, 157, 715, 156, 155; 707/201, 1, 707/9, 100, 101; 380/258, 281; 709/227, 709/229
See application file for complete search history.

(56) References Cited

FOREIGN PATENT DOCUMENTS

EP    0 940 960 A1    9/1999

OTHER PUBLICATIONS

"Internet X.509 Public Key Infrastructure Certificate and CRL Profile", C:\TRW\PKI\Role Application\rfc 2459.htm. Dec. 4, 2000, pp. 1–114.
"In A New E–Business EraPKI Enters Widespread Use", Nikkei Internet Technology, No. 33, Nikkei Business Publications, Inc. pp. 63–71, Mar. 22, 2000 (Article & translation attached).
Yukihiro Katsumura, "Get Ready for PKI Era", Nikkei Internet Technology, No. 27, Nikkei Business Publications, Inc. pp. 106–113, Sep. 22, 1999 (Article & translation attached).
Michael Fleming Grubb, et al.; "*Single Sign–On and the System Administrator*"; Twelfth System Administration Conference Lisa; '98, Dec. 6, 1998, pp. 63–86, CP002154500; Boston US; *abstract* *p. 72, right–hand col., line 26–42* *p. 75, right hand col., line 30–40.
European Search Report for EP 01 11 2852; search completed—Oct. 1, 2004.

*Primary Examiner*—Gregory Morse
*Assistant Examiner*—Ellen C Tran
(74) *Attorney, Agent, or Firm*—Tarolli, Sundheim, Covell & Tummino L.L.P.

(57) ABSTRACT

A method and computer program in which a user (132) may have a digital certificate created using a strong authentication technique. Once the user has the digital certificate he may then request the generation of a "single sign-on" certificate that will allow the user (132) access to a foreign computer networks. This is accomplished by the user (132) contacting a registration web server (124) and requesting the generation of "single sign-on" for the foreign computer network. Thereafter, the registration web server (124) may take a public key generated based on the digital certificate and request the creation of a "single sign-on" by simply creating a public key from the digital certificate.

17 Claims, 2 Drawing Sheets

TECHNIQUE FOR OBTAINING A SINGLE SIGN-ON CERTIFICATE FROM A FOREIGN PKI SYSTEM USING AN EXISTING STRONG AUTHENTICATION PKI SYSTEM

CROSS-REFERENCE TO RELATED APPLICATIONS

This application claims the benefit of U.S. Provisional Application No. 60/210,464 filed on Jun. 9, 2000, U.S. Ser. No. 60/210,462 filed on Jun. 9, 2000, and U.S. Provisional Application No. 60/229,336 filed on Sep. 1, 2000, the contents of which are expressly incorporated by reference herein.

FIELD OF THE INVENTION

The invention relates to a technique for obtaining a single sign-on certificate using a strong authentication public key infrastructure (PKI) system. More particularly, the present invention relates to a method and computer program by which digital certificates issued by different vendors may be generated and utilized under a PKI system having strong authentication built into it to ensure only authorized members of the firm have access.

BACKGROUND OF THE INVENTION

For centuries individuals, governments, and business entities have searched for mechanisms and techniques whereby sensitive information may be transmitted to authorized parties over long distances and still remain secure. The problem faced by the foregoing entities is how can information be sent to the individual or entities that require it and still be assured that unauthorized parties may not be able to comprehend the transmitted information should they intercept it. Early methods of securing information have employed scrambling techniques, lookup tables, substitution ciphers, and code books in which letters or terms would be substituted for the original letters and terms in the information. These techniques frequently required that both the sender and receiver of information have access to the same code book. One danger in such a technique is that the code book would fall into unauthorized hands.

In the early twentieth century, and particularly during World War II code books were replaced by electromechanical cipher machines. Both the sender and receiver would have an identical cipher machine used to encrypt and decrypt messages sent. In order to make it more difficult to decrypt these messages the cipher machines have the ability to change the cipher used in a message or change the cipher used for every few words within a message. In order to accomplish this the cipher machine would need to know the initial state or key utilized to encrypt the message.

In recent years the cipher machines have been replaced by digital encryption algorithms in which both the sender and receiver have an identical copy of the digital encryption algorithm and a common key used to encrypt and decrypt messages. Both the encryption algorithm and key are held secret by both the sender and receiver.

More recently another encryption technique has been developed in which two separate keys are used for encryption and decryption. A public key is transmitted freely to whoever requires it and is used to encrypt messages for a particular receiver. The receiver would have an associated private key which may be used to decrypt the message encrypted with the associated public key. For each public key there is only one private key and for each private key there is only one public key. When sending a message to several recipients it is necessary to have each recipient's public key. The message would then be separately encrypted using each recipient's public key and transmitted to that particular recipient. Therefore, if ten separate entities are to receive the same message, ten separate messages would be transmitted with each message encrypted with individual's public key. With the advent of the Internet, such a public key infrastructure has gained significant acceptance as discussed in request for comments number 2459, by Ford et al., entitled "Internet X.509 Public Key Infrastructure", herein incorporated in its entirety by reference.

In addition to the need for the encryption and decryption of messages, with the advent of electronic mail and the Internet a need has developed for a secure mechanism to indicate approval and acceptance by an individual. In the past an individual would typically show his approval or acceptance of such items as a contract or an order via a handwritten signature, a stamp, or a seal which would only be held by that individual. Anyone else that attempted to imitate such a signature, stamp, or seal would be subject to criminal penalties. With the advent of electronic mail and the Internet, a need has arisen to take advantage of the ease and speed of electronic mail to indicate, by a person or entity with proper authority, approval or acceptance of a contract or purchase. This has come to be known as a digital signature in which an individual may digitally sign a document.

This digital signature capability has been implemented using the same public key infrastructure previously discussed. However, instead of an entire document being encrypted, the document itself is passed through a one-way hashing algorithm that produces a small document, referred to as a digest. This digest is then encrypted using the individual's private key, also known as a private signing key, and is appended to the document. The receiver of the document can verify the authenticity of the digital signature (digest) by stripping the signature from the document and recomputing the hash function on the document to generate as a received digest. Using public signing key, included in the document or previously received, it is possible to decrypt the digest of the document and compare it to the digest as received. If the two digest match, then the signature is authenticated. Therefore, using the aforementioned public key infrastructure it is possible to both encrypt and decrypt messages as well as digitally sign documents.

However, in the aforementioned public key infrastructure, in spite of the Internet X.509 infrastructure acceptance, certificates generated by one supplier's software may not be compatible with that of another supplier's software. For example, Microsoft™ in Windows 2000™ provides for the generation of digital certificates for the purpose of "single sign-on" by a user to a Microsoft™ network. Typically the user would request such a single sign-on certificate by utilizing a conventional web browser to access a domain certificate authority. The user would then fill in the requested information and the domain certificate authority may optionally require the concurrence of an administrator to approve the issuance of the certificate. It should be noted that the user is not required to provide any proof of identity and normally no authentication of identity occurs. However, the certificate issued is often only accepted by only Windows 2000™ and certificates generated by other PKI systems may not be accepted by Windows 2000™.

Therefore, what is needed is a method and computer program in which a user having a PKI system may generate certificates that can be used for another PKI system in a single simple process that does not require the reentry of data. Further, this method and computer program should allow for user authentication and user mobility from one computer to another.

SUMMARY OF THE INVENTION

An embodiment of the present invention provides for a method of creating a single sign-on certificate using a PKI system. This method begins by a user accessing a PKI system in which a digital signature certificate has been previously created for the user and transmitting the digital signature certificate to the PKI system. The PKI system then verifies the identity and validity of the user by accessing a directory using the digital signature certificate. A private/public key pair is created and the public key is transmitted to the PKI system. The public key is transmitted to a domain certificate authority for signature which returns the public key to the user signed by the domain certificate authority.

Further, an embodiment of the present invention is a computer program embodied on a computer readable medium and executable by a computer. This computer program begins by a user accessing a PKI system in which a digital signature certificate has been previously created for the user and transmitting the digital signature certificate to the PKI system. The PKI system then verifies the identity and validity of the user by accessing a directory using the digital signature certificate. A private/public key pair is created and the public key is transmitted to the PKI system. The public key is transmitted to a domain certificate authority for signature which returns the public key to the user signed by the domain certificate authority.

A still further, an embodiment of the present invention is a method of creating a single sign-on role certificate using a PKI system. This method begins by creating a digital signature certificate by a security officer or other firm employee verifying the users identity and receiving approval by the user's management. A password is delivered to the user through the mail to the user's home address. The PKI system is accessed by the user using the password. The digital signature certificate is downloaded from the PKI system by the user. The PKI system is accessed by the user using the digital signature certificate. The validity of the user is verified by the PKI system accessing a directory using the digital signature certificate. A private/public key pair is generated and transmitted the public key to the PKI system. The public key is transmitted to a domain certificate authority for signature. The public key is returned to the user signed by the domain certificate authority.

These and other features of this system, method and computer program will become more apparent from the following description when taken in connection with the accompanying drawings which show, for purposes of illustration only, examples in accordance with the present invention.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Figure 1:
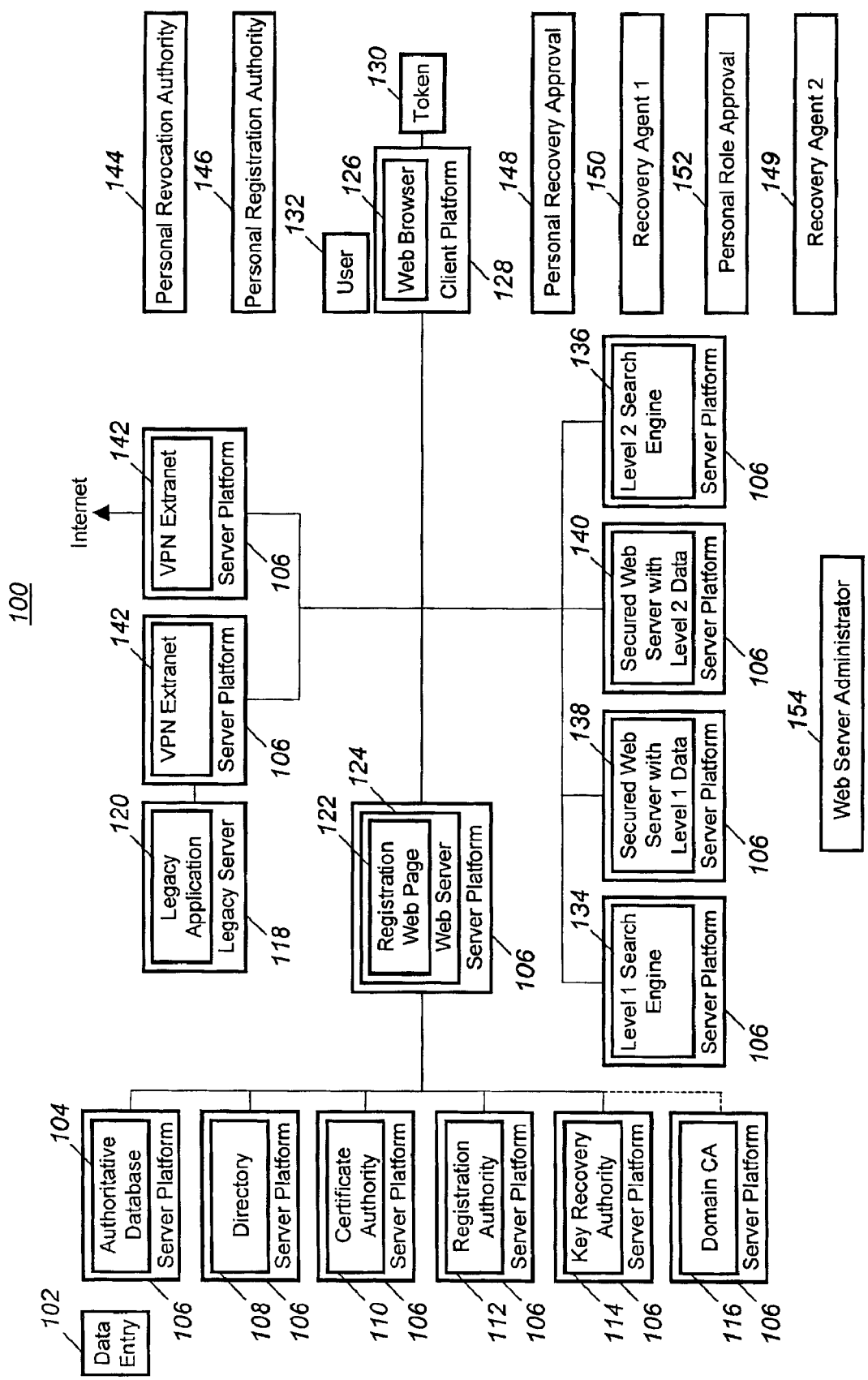
FIG. 1 is a module configuration diagram of the software, firmware, and hardware used in the embodiments of the present invention.

Before beginning a detailed description of the subject invention, mention of the following is in order. When appropriate, like reference numerals and characters may be used to designate identical, corresponding or similar components in differing figure drawings. Further, in the detailed description to follow, exemplary sizes/models/values/ranges may be given, although the present invention is not limited to the same.

FIG. 1 is a module configuration diagram of the software, firmware, and hardware used in the embodiments of the present invention. The blocks illustrated in FIG. 1 represent modules, code, code segments, commands, firmware, hardware, instructions and data that are executable by a processor-based system(s) and may be written in a programming language, such as, but not limited, to C++. It should be noted that the modules depicted in FIG. 1 are shown as contained in separate server platforms. However, these modules are not limited to residing on separate servers and may reside and execute on one computer or any number of computers depending on the number of users the system must handle and the communications involved. FIGS. 2 through 10 are flowcharts further detailing the operations executed by the modules shown in FIG. 1.

FIG. 1 illustrates an exemplary architecture 100 in which the Public Key Infrastructure (PKI) processes of the present invention may be practiced. However, as previously discussed, it should be understood that the present invention is not limited to the architecture 100 of FIG. 1. The Architecture 100 includes Data Entry 102 which performs a Data Entry function for Authoritative Database 104 which is resident on the server platform 106. A server platform 106 is referred to in this description but it should be understood that the present invention is not limited to any particular server architecture. The server platform 106 maybe without limitation UNIX or Windows NT servers. The authoritative database 104 contains information about members of the group or enterprise for which PKI services in accordance with the present invention are performed. The present invention is not limited by the structure of the group enterprise for which information is stored in the authoritative database 104. The authoritative database 104 information includes, without limitation, the name, address, telephone numbers, manager's name, employee identification etc., of the members of the group or enterprise. Directory 108 has the structure of the database but is optimized for fast look-up of information stored therein rather than fast data entry. The data in the Directory 108 is not changed frequently but is required to be "accessed rapidly and functions on-line as a fast phone book" containing reference information about the members of the group or enterprise stored in the authoritative database 104. Certificate authority 110 is a conventional off-the shelf software executed on server platform 106 providing storage of certificates and related information used by the present invention as described in more detail hereinafter. Registration authority 112 is also off-the shelf software executable on server platform 106 regarding registration performed by the present invention as described in more detail hereinafter. Key authority 114 is also off-the shelf server software which is executable on Server Platform 106 for recovering keys from members of the group or enterprise as described in more detail hereinafter. Domain certificate authority CA 116 may use certificates provided by the present invention for a single sign-on to the architecture of FIG. 1. Legacy server 118 executes legacy application programs 120. The legacy server maybe, without limitation, a main frame, mini-computer, workstation or other server hosting legacy software applications that are designed to be run on PKI processes in accordance with the present invention. The legacy applications 120 are accessible on the client side by a custom client 128 such as an emulator or custom database Graphic User Interface (GUI). Examples of emulators are terminal emulators of an IBM 3270 or terminal emulators of a vt 100. Registration web page 122, which maybe one or more pages, functions as the user interface to the architecture 100 of FIG. 1. Web Server 124 is a software application which serves Web Pages such as Web Page 122 or other HTML outputs to a web browser client which may be without limitation Apache or a Microsoft Internet Information Server. Web browser 126 is resident on client platform 128 which may be any user computer. Web browser 126 is a client software application for browsing web pages such as but not limited to HTML or XML protocols or other protocols. The Web browser 126 is programmed to operate with PKI certificates issued by the certificate authority 110. Examples of web browsers which has this capability are Netscape Navigator and the Microsoft Internet Explorer. The token 130 is a smart card, USB (Universal Serial Bus) or other hardware token capable of generating storing and using PKI certificates. A user 132 is a person using the architecture 100. A user 132 transitions through a number of states which include a new user, current user and a former user who no longer is a member of the group or enterprise. The Architecture 100 is described with reference to two levels of security but the number of the levels of security is not a limitation of the present invention with each level corresponding to a different security requirement. The level 1 search engine 134 is a search engine which is permitted to search through the architecture 100 but is allowed access to only level 1 data which is the lowest level of security and may be without limitation data which is freely distributable Level 2 data may be considered to be proprietary. Level 2 search engine 136 is a search engine which is allowed to search through both level 1 and level 2 data. A Level N search engine (not illustrated) is a search engine which is allowed to search through servers possessing Levels 1 through N of data. A secured level server with Level 1 data is a web server containing only level 1 data which is secured so that users may have level to level 1 servers. A secured web server with level 2 data 140 is a Web Server that contains level 2 data which has been secured so that users must have level 2 access with level 2 users having access to both level 1 and level servers. A secured web server with level N data (not illustrated) is a web server that contains level N data which is accessible by user with level N or above access to all levels of data up through level N access. VPN Extranet 142 is a software application which functions as a network gateway, which as illustrated, may be either to legacy server 118 and legacy application 120 or to an external network such as the Internet. Personal registration authority 144 is a person who is in charge of revocation of members from the network 100. Personal registration authority 146 is a person who is in charge of registration of members in the network 100. Personal recovery approval 1 148 and personal recovery agent 2 149 are persons responsible for obtaining recovery of certificates. A Recovery Agent 150 is a person who performs recovery of certificates and may only recover a certificate if the certificate has first been designated as recoverable by another person. Personal role approval 152 is a person who approves different role function within the network 100. A web server administrator is in charge of various web functions in the network 100.

Before entering into a discussion of the flowchart, a brief discussion of the nature and function and structure of a certificate is necessary. As will become apparent from review of FIG. 2, the embodiments of the present invention rely on the usage of a certificate. A certificate is based on an X.509 certificate (V3) discussed in detail in item 4 of RFC 2459, previously incorporated herein by reference. The X.509 certificate is a public key certificate utilized for either encryption purposes or as a signature key by a PKI system. It should not be confused with a "single sign-on" certificate which may not be compatible or similar to the X.509 certificate. The information contained in the X.509 certificate will vary according to whether it is set up as a signature certificate or as a public key for encryption. The X.509 certificate contains at least those fields shown in table 1 ahead.

TABLE 1

X.509 (v3) Certificate version (V3)
serial number
signature algorithm ID
issuer name
validity period
subject name
subject public key information
issuer unique identifier
subject unique identifier
Extensions In the example embodiments of the present invention, the X.509 certificate is created using a strong authentication and delivery method. The user 132 must first apply for the certificate via human resources or security and provide proof of his identity. The immediate superior for user 132 is then contacted for his approval to receive the X.509 certificate. Thereafter, via the mail to the User's 132 home address, a one time password is sent to the user 132 which enables delivery of the X.509 certificate to the user 132. The user 132 may then download to his computer the X.509 certificate via an encrypted secure channel. The X.509 certificate may also be placed on a hardware token, smart card, or magnetic strip card so that the user 132 may keep it on his person and move from one computer to another.

Figure 2:
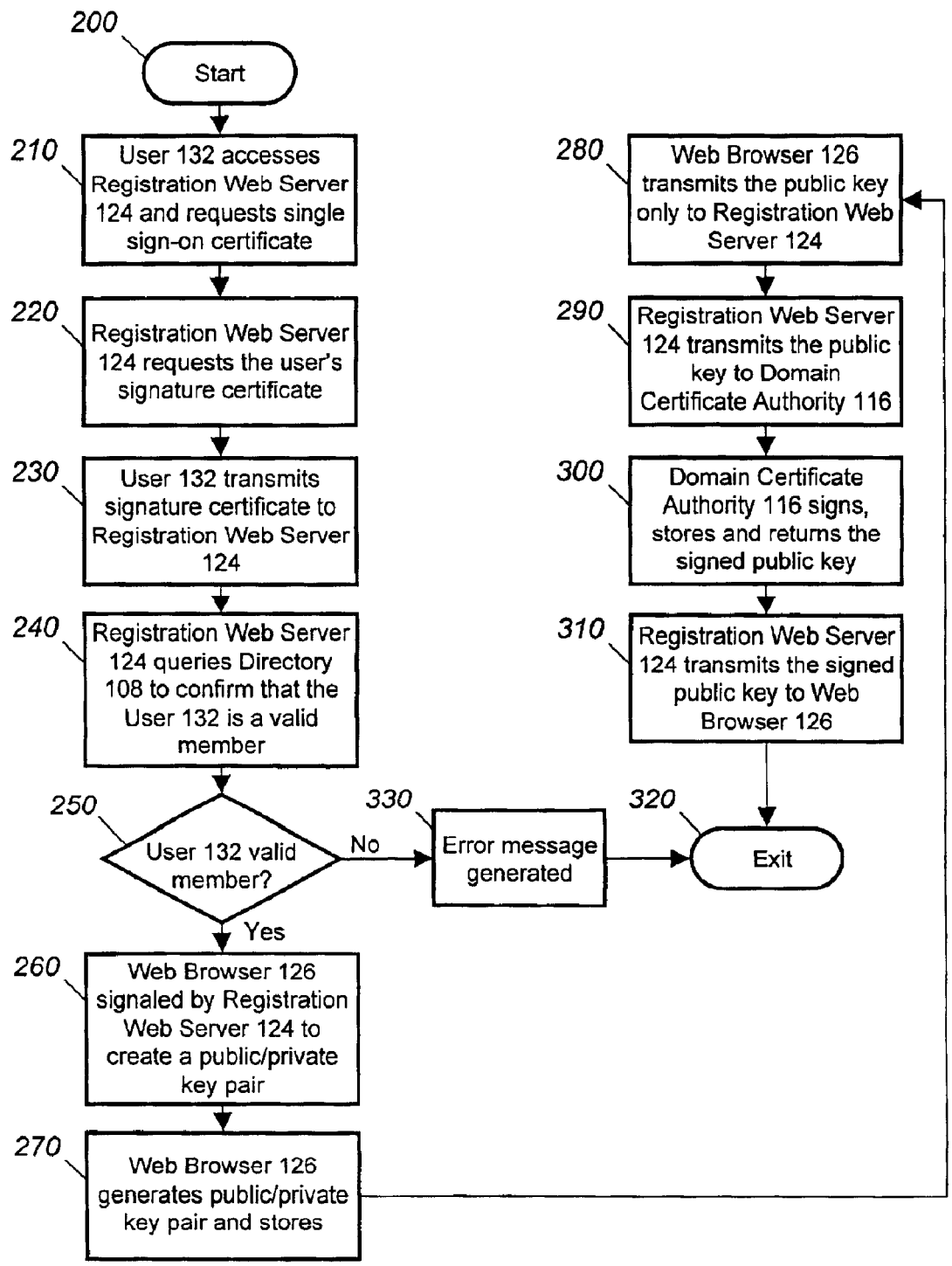
FIG. 2 is a flowchart of example embodiment of the process for obtaining single sign-on certificate in the present invention.

FIG. 2 is a flowchart of an example embodiment in the present invention where a "single sign-on" certificate is created for user 132. The method and computer program shown in FIG. 2 begins execution in operation 200 and immediately proceeds to operation 210. In operation 210, the user accesses the registration web server 124 via web browser 126 and request a single sign-on certificate. Thereafter, the registration web server 124 requests the user 132 for a user signature certificate. This user signature certificate would be the X.509 certificate previously discussed and would have been created by the process previously discussed. In operation 230, the user 132 transmits his signature certificate to registration web server 124. Thereafter, in operation 240, registration web server 124 queries directory 108 to confirm that the user 132 is a valid member of the organization. Processing then proceeds to operation 250 or a check of users 132 validity is a member of the organization is done. If the user 132 is not valid member of the organization an error message is generated in operation 330 and processing proceeds to terminate in operation 320.

However, if the user is a valid member of the organization processing then proceeds to operation 260. In operation 260, registration web server 124 signals web browser 126 to create a private/public key pair. Thereafter, in operation 270 web browser 126 generates the public/private key pair and stores it locally. In operation 280, web browser 126 transmits the public key only to the registration web server 124. Thereafter, in operation 290, registration web server 124 transmits the public key to the domain certificate authority (CA) 116. In operation 300 the main certificate certificate authority 116 digitally signs the public key received and stores that locally in its directory. This domain certificate authority 116 may be, but not limited to, a Windows 2000™ network. Thereafter, the domain certificate authority 116 transmits assigned public key back to the registration web server 124. In operation 310, registration web server 124 transmits the signed public key to the web browser 126. Further, in operation 310, the web browser 126 upon receipt of the signed public key may either store locally or copy it to a hardware token, smart card, or a magnetic strip embedded in a card. Thereafter, processing proceeds to operation 320 where processing terminates.

Using the embodiments of the present invention, an organization or individual may create processes, computer software and methods for creating a "single sign-on" certificate useful on an another foreign and noncompatible system using its own PKI system. The individual's PKI system may be set up in such fashion as to require strong authentication of the individual's identity before any "single sign-on" certificate is created. Therefore, the user is not required to enter the same information in order to generate a "single sign-on" certificate and access to the creation of such certificates is limited to authorize individuals only.

While we have shown and described only a few examples herein, it is understood that numerous changes and modifications as known to those skilled in the art could be made to the present invention. For example, any type of computer architecture may be utilized for the embodiments of present invention. Further, the present invention may be written in any general-purpose computer language. Also, security may be enhanced through the use of encrypted secure communications lines whenever a private or public key is transmitted over the network. Therefore, we do not wish to be limited to the details shown and described herein, but intend to cover all such changes and modifications as are encompassed by the scope of the appended claims.

I claim:

1. A method of creating a single sign-on role certificate using a PKI system, comprising:
    accessing a PKI system, though a client platform, by a user in which a digital signature certificate has been previously created for the user and transmitting the digital signature certificate to the PKI system;
    verifying the identity and validity of the user by accessing a directory using the digital signature certificate;
    signaling the client platform to create a private/public key pair;
    generating the private/public key pair at the client platform and transmitting the public key of the private/public key pair of the PKI system from the client platform;
    transmitting the public key to a domain certificate authority for signature; and
    returning the public key to the client platform signed by the domain certificate authority, wherein the signed public key is operative as the single sign-on role certificate.

2. The method recite in claim 1, further comprising:
    authenticating the user identity; and
    verifying the user has authority to receive the public key.

3. The method recite in claim 2, further comprising:
    delivering a password to the user through the mail to the user's home address;
    accessing the PKI system by the user using the password; and
    receiving the digital signature certificate.

4. The method recite in claim 3, wherein the digital signature may be used for both signatures and encryption.

5. The method recite in claim 1, wherein the verifying the identity and validity of the user by PKI system by accessing a directory using the digital signature certificate further comprises;
    verifying that the digital signature certificate has not been revoked; and
    verifying that the user is still a member of the organization.

6. The method recite in claim 5, further comprising:
    storing the public key signed by the domain certificate authority in a hardware token, smart card, a computer, a magnetic strip card, or other storage device.

7. The method recite in claim 6, further comprising;
    accessing a foreign computer network not associated with the PKI system using the public key signed by the domain certificate authority.

8. A computer program embodied on a computer readable medium and executable by a computer to create a single sign-on role certificate using a PKI system, comprising:
    receiving a digital certificate associated with a user from a client platform;
    verifying the identity and validity of the user by accessing a directory using the digital signature certificate;
    signaling the client platform to create a private/public key pair;
    receiving the public key of the private/public key pair from the client platform;
    transmitting the public key to a domain certificate authority for signature; and
    receiving a signed public key from the domain certificate authority; and
    returning the signed public key to the client platform signed by the domain certificate authority, wherein the signed public key is operative as the single sign-on role certificate.

9. The computer program recited in claim 8, further comprising:
    authenticating the user identity; and
    verifying the user has authority to receive the public key.

10. The computer program recited in claim 9, wherein the digital signature certificate may be used for both signature and encryption.

11. The computer program recited in claim 8, wherein verifying the identity and validity of the user by PKI system by accessing a directory using the digital signature certificate further comprises;
    verifying that the digital signature certificate has not been revoked; and verifying that the user is still a member of the organization.

12. The computer program recited in claim 11, further comprising:

accessing a foreign computer network not associated with the PKI system using the public key signed by the domain certificate authority.

13. A method of creating a single sign-on role certificate using a PKI system, comprising:

creating a digital signature certificate verifying the identity of a user and authority of the user to obtain the digital signature certificate;

delivering a password to the user through the mail to the users home address;

accessing a PKI system, through a client platform, by the user using the password;

receiving the digital signature certificate from the PKI system;

accessing a PKI system through the client platform, by a user using the digital signature certificate;

verifying the validity of the user by accessing a directory using the digital signature certificate;

signaling the client platform to create a privite/public key pair;

generating the private/public key pair and transmitting the public key of the private/public key pair to the PKI system from the client platform;

transmitting the public key to a domain certificate authority for signature; and returning the public key to the client platform signed by the domain certificate. authority, wherein the signed public key is operative as the single sign-on role certificate.

14. The method recite in claim 13, wherein the digital signature certificate is used for both signatures and encryption.

15. The method recite in claim 13, wherein verifying the identity and validity of the user by PKI system by accessing directory using the digital signature certificate further comprises;

verifying that the digital signature certificate has not been revoked; and verifying that the user is still a member of the organization.

16. The method recite in claim 15, further comprising:

storing the public key signed by the domain certificate authority in a hardware token, smart card, a computer, a magnetic strip card, or other storage device.

17. The method recited in claim 16, further comprising:

accessing a foreign computer network not associated with the PKI system using the public key signed by the domain certificate authority.

\* \* \* \* \*

UNITED STATES PATENT AND TRADEMARK OFFICE
CERTIFICATE OF CORRECTION

| | | |
|---|---|---|
| PATENT NO. | : 7,069,440 B2 | Page 1 of 1 |
| APPLICATION NO. | : 09/822958 | |
| DATED | : June 27, 2006 | |
| INVENTOR(S) | : Kenneth W. Aull | |

It is certified that error appears in the above-identified patent and that said Letters Patent is hereby corrected as shown below:

Column 10, line 4, after "certificate" delete ".".

Signed and Sealed this

Twenty-seventh Day of March, 2007

JON W. DUDAS
*Director of the United States Patent and Trademark Office*